(12) United States Patent
Cortez (10) Patent No.: US 10,970,379 B2
(45) Date of Patent: Apr. 6, 2021

(54) SYSTEM AND METHOD FOR ACCESSING SECURED DATA

(71) Applicant: Jessie Cortez, Homeland, CA (US)

(72) Inventor: Jessie Cortez, Homeland, CA (US)

( * ) Notice: Subject to any disclaimer, the term of this patent is extended or adjusted under 35 U.S.C. 154(b) by 0 days.

(21) Appl. No.: 16/935,980

(22) Filed: Jul. 22, 2020

(65) Prior Publication Data

US 2021/0049256 A1 Feb. 18, 2021

Related U.S. Application Data

(60) Provisional application No. 62/885,382, filed on Aug. 12, 2019.

(51) Int. Cl.
*G06F 21/36* (2013.01)
*G06F 3/0484* (2013.01)
*G06F 3/0481* (2013.01)
*G06F 21/62* (2013.01)

(52) U.S. Cl.
CPC ............ *G06F 21/36* (2013.01); *G06F 3/0481* (2013.01); *G06F 3/04842* (2013.01); *G06F 21/6218* (2013.01)

(58) Field of Classification Search
CPC .............................. G06F 21/36; G06F 21/6218
USPC .......................................................... 726/18
See application file for complete search history.

(56) References Cited

U.S. PATENT DOCUMENTS

| | | | |
|---|---|---|---|
| 2008/0077978 A1* | 3/2008 | Repasi | G06F 21/36 726/5 |
| 2017/0205983 A1* | 7/2017 | Oguz | G06F 21/6218 |
| 2017/0228525 A1* | 8/2017 | Wajs | G06F 21/105 |
| 2018/0276365 A1* | 9/2018 | D'Alterio | G06F 21/36 |
| 2019/0141029 A1* | 5/2019 | Dube | H04L 63/102 |

* cited by examiner

*Primary Examiner* — Dant B Shaifer Harriman
(74) *Attorney, Agent, or Firm* — Jafari Law Group, Inc.

(57) ABSTRACT

The present invention generally involves a mobile application configured to guard access to other applications that may be stored within a smartphone. For example, applications stored within the smartphone may include password managers, email clients, or payment applications, which a user of the smartphone may desirably secure by providing an extra layer of protection. In exemplary embodiments, the security application may employ GUI configured to display a folder for allowing a user to select which mobile applications to secure. The GUI may display a set of images as a means of implementing an authentication protocol to provide a user with access to the stored data. The user may control certain settings such as the source of the authenticating images, the number of images and authenticating images, and or a sequence that may be an authenticating sequence associated with the authenticating images for granting access to the data.

8 Claims, 11 Drawing Sheets

SYSTEM AND METHOD FOR ACCESSING SECURED DATA

TECHNICAL FIELD OF THE INVENTION

The present invention relates in general to system and method for accessing secured data. More specifically, the present invention relates to an access authorization system and method in which at least one client electronic device, such as a smartphone, may be configured with a mobile application that manages access to data including other applications stored within the smartphone.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Keeping data secured is an ever-increasing challenge as technology advances and continues to develop. It is well known that electronic devices such as smartphones, tablets, personal computers, servers or entire computer systems may be targeted by unauthorized users in any number of ways. Sometimes, unauthorized users may simply seek to access electronic data stored in restricted systems to view or copy. For example, the electronic data may be intellectual content that is manipulated by these devices, such as, for example, when the data comprises music, movies, e-books, database information, or other forms of data that are privileged, copyrighted, proprietary or otherwise protected from unauthorized access. Other times, unauthorized users may seek unauthorized access to such electronic devices for obtaining control of a particular system or the electronic device itself. For example, access to the electronic data may be used to control the device itself, such as, for example, when the data comprises a computer software program.

In either scenario, the electronic data is valuable. In situations concerning intellectual property or other confidential data, the concern may be primarily of privacy. In situations concerning sensitive systems configured to operate one or more devices, the concern may be primarily of security or even safety. In either case, controlling the secured access to electronic data is desirable.

Various methods have been developed to secure an electronic device. For example, smartphones and tablets may implement passcodes that require a user input in order to authenticate the user. Passcodes may include words, numbers or alphanumeric combinations that are uniquely known to the authorized user, and without providing the passcode an unauthorized user will not be able to access the data stored in the electronic device. The problem with these measures of security is that passcodes—even when they are extremely unique—may nonetheless be deciphered and used to gain access. In some instances, knowing personal information of the user is enough for an unauthorized user to figure out the required passcode. In other instances, software may be implemented to derive or decipher the passcode autonomously; it is well known that such passcode breaking software is becoming more readily available.

More complex methods of verification include multistep-step verification where a user is required to have access to multiple devices. For example, a user may be required to have access to a first device—such as a smartphone—before being provided with a passcode or key to use on a second device—for example a personal computer with access to a secured server. The problem with these methods is that unauthorized users often find ways around multi-step verification including knowing or previously gaining access to an authorized user's email. For example, because these devices may all be connected in some way by accounts belonging to the authorized user, it is nevertheless possible for an unauthorized user to request passcodes via a known email of the authorized user commonly accessible via both devices.

Of course, when a user of a mobile device wants to secure access to applications that have secured data themselves, such two-step authentication methods do not work well because the data is stored in the mobile device itself. As such, these methods are not suitable for controlling access to applications stored within the same mobile device.

Accordingly, there are several problems with the current state of the art that have not been adequately addressed. There is an inadequately addressed need for a system and method that prevents unauthorized access to electronic data stored in an electronic medium, in a manner that is undecipherable by unauthorized users. The problems persist because a need for preventing unauthorized access to electronic data, and more specifically to data including a mobile application stored within a mobile device has not been adequately met.

Therefore, there is a need for a system and method for accessing data that: does not depend exclusively on passcodes or other decipherable authentication methods, provides a complex algorithm that only a user with personal knowledge may authenticate; and may be easily implemented in such a way so as to secure access to data including files and or one or more mobile applications within the same device.

It is to these ends that the present invention has been developed.

SUMMARY OF THE INVENTION

To minimize the limitations in the prior art, and to minimize other limitations that will be apparent upon reading and understanding the present specification, the present invention describes a system and method for accessing secured data, including for example files or a mobile application.

Generally, the present invention involves a security application configured to guard access to files or even other applications that may be stored within a mobile device such as a smartphone. For example, mobile applications stored within the smartphone may include password managers, email clients, or payment applications, which a user of the smartphone may desirably secure by providing an extra layer of protection. In exemplary embodiments, the security application may employ a graphical user interface or GUI configured to display a folder for storing the files and or mobile applications desirably secured with the security application. When the user selectively decides to launch a mobile application "stored" within said folder, a first screen of the GUI may be launched displaying a set of images as a means of implementing an authentication protocol to provide a user with access to the desired mobile application. In exemplary embodiments, the user may control certain settings such as the source of the authenticating images, the number of images and authenticating images, and or a sequence that may be an authenticating sequence associated with the authenticating images for granting access to the data, such as files or one or more mobile applications "stored" within the displayed folder.

A method for accessing a secured mobile application by way of a graphical user interface (GUI), in accordance with exemplary embodiments of the present invention, may include: receiving a request to launch a secured application; launching a first window within a mobile device touchscreen, the first window including a plurality of images comprising a plurality of authenticating images; within the first window, periodically shuffling a position of one or more of the plurality of images; receiving via the mobile device touchscreen a user input comprising an ordered selection of the plurality of authenticating images; authenticating access to a secured application by matching the ordered selection to a programmable ordered selection of the plurality of authenticating images; and launching a second window in response to the user input via the mobile device touchscreen, wherein the second window includes a launch screen of the secured application.

A system for securing and accessing a mobile application, in accordance with exemplary embodiments of the present invention, may include: a client device; one or more mobile applications stored within the client device; and a graphical user interface (GUI) stored within the client device and configured to: receive a request to launch a secured application; launch a first window within a mobile device touchscreen, the first window including a plurality of images comprising a plurality of authenticating images; within the first window, periodically shuffle a position of one or more of the plurality of images; receive via the mobile device touchscreen a user input comprising an ordered selection of the plurality of authenticating images; authenticate access to a secured application by matching the ordered selection to a programmable ordered selection of the plurality of authenticating images; and launch a second window in response to the user input via the mobile device touchscreen, wherein the second window includes a launch screen of the secured application.

In another embodiment, a system for securing and accessing a mobile application, may include: a client device; one or more mobile applications stored within the client device; and a graphical user interface (GUI) stored within the client device and configured to: receive a request to launch a secured application; launch a first window within a mobile device touchscreen, the first window including a plurality of images comprising at least one authenticating image; within the first window, periodically shuffle a position of one or more of the plurality of images; receive via the mobile device touchscreen a user input comprising an ordered selection of the at least one authenticating image; match the ordered selection to a programmable ordered selection including the at least one authenticating image; and launch a second window in response to the user input via the mobile device touchscreen, wherein the second window includes a launch screen of a secured application.

In another embodiment, a method for accessing a secured mobile application by way of a graphical user interface (GUI), may include: receiving a request to launch a secured application; launching a first window within a mobile device touchscreen, the first window including a plurality of images comprising at least one authenticating image; within the first window, periodically shuffling a position of one or more of the plurality of images; receiving via the mobile device touchscreen a user input comprising an ordered selection of the at least one authenticating image; matching the ordered selection to a programmable ordered selection including the at least one authenticating image; and launching a second window in response to the user input via the mobile device touchscreen, wherein the second window includes a launch screen of a secured application.

In yet another embodiment, a system for authenticating a payment via a secured mobile application, in accordance with exemplary embodiments of the present invention, includes: a first client device configured to communicate with a server hosting a payment portal; a second client device configured to communicate with the first client device via wireless interface; at least one secure payment application stored within the second client device; a graphical user interface (GUI) executable by the second client device, configured to: receive a request to launch the secure payment application; launch a first window within a touchscreen of the second client device, the first window including a plurality of images comprising at least one authenticating image; within the first window, periodically shuffle a position of one or more of the plurality of images; receive a user input comprising an ordered selection of the at least one authenticating image; match the ordered selection to a programmable ordered selection including the at least one authenticating image; and launch a second window in response to the user input via the mobile device touchscreen, wherein the second window includes a launch screen of the secured payment application; and sending a secured payment information to the server from the second client device.

In yet another embodiment, a method for authenticating a payment via a secured mobile application, in accordance with exemplary embodiments of the present invention, includes: establishing a first communication between a first client device and a server hosting a payment portal; establishing a second communication between a second client device and the first client device via a wireless interface, wherein the second client device includes at least one secure payment application and a graphical user interface (GUI) executable by the second client device; receiving a request to launch the secure payment application; launching a first window within a touchscreen of the second client device, the first window including a plurality of images comprising at least one authenticating image; within the first window, periodically shuffle a position of one or more of the plurality of images; receiving a user input comprising an ordered selection of the at least one authenticating image; matching the ordered selection to a programmable ordered selection including the at least one authenticating image; launching a second window in response to the user input via the mobile device touchscreen, wherein the second window includes a launch screen of the secured payment application; and sending a secured payment information to the server from the second client device.

It is an objective of the present invention to provide a means of securing electronic data, which minimizes or obviates the dependence on passcodes.

It is another objective of the present invention to provide a means of securing electronic data stored on a secured device, which implements a visual authentication via a graphical user interface.

It is yet another objective of the present invention to provide a means of making a secured payment.

These and other advantages and features of the present invention are described herein with specificity so as to make the present invention understandable to one of ordinary skill in the art.

BRIEF DESCRIPTION OF DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows.

DESCRIPTION OF THE INVENTION

In the following discussion that addresses a number of embodiments and applications of the present invention, reference is made to the accompanying figures, which form a part thereof. Depictions are made, by way of illustration, of specific embodiments in which the invention may be practiced; however, it is to be understood that other embodiments may be utilized and changes may be made without departing from the scope of the present invention. Whenever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components, and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments, whether these features, elements, and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, a system and method for accessing a secured mobile application. Exemplary embodiments of the present disclosure are described with reference to the drawings for illustration purposes and are not intended to limit the scope of the present disclosure.

Figure 1:
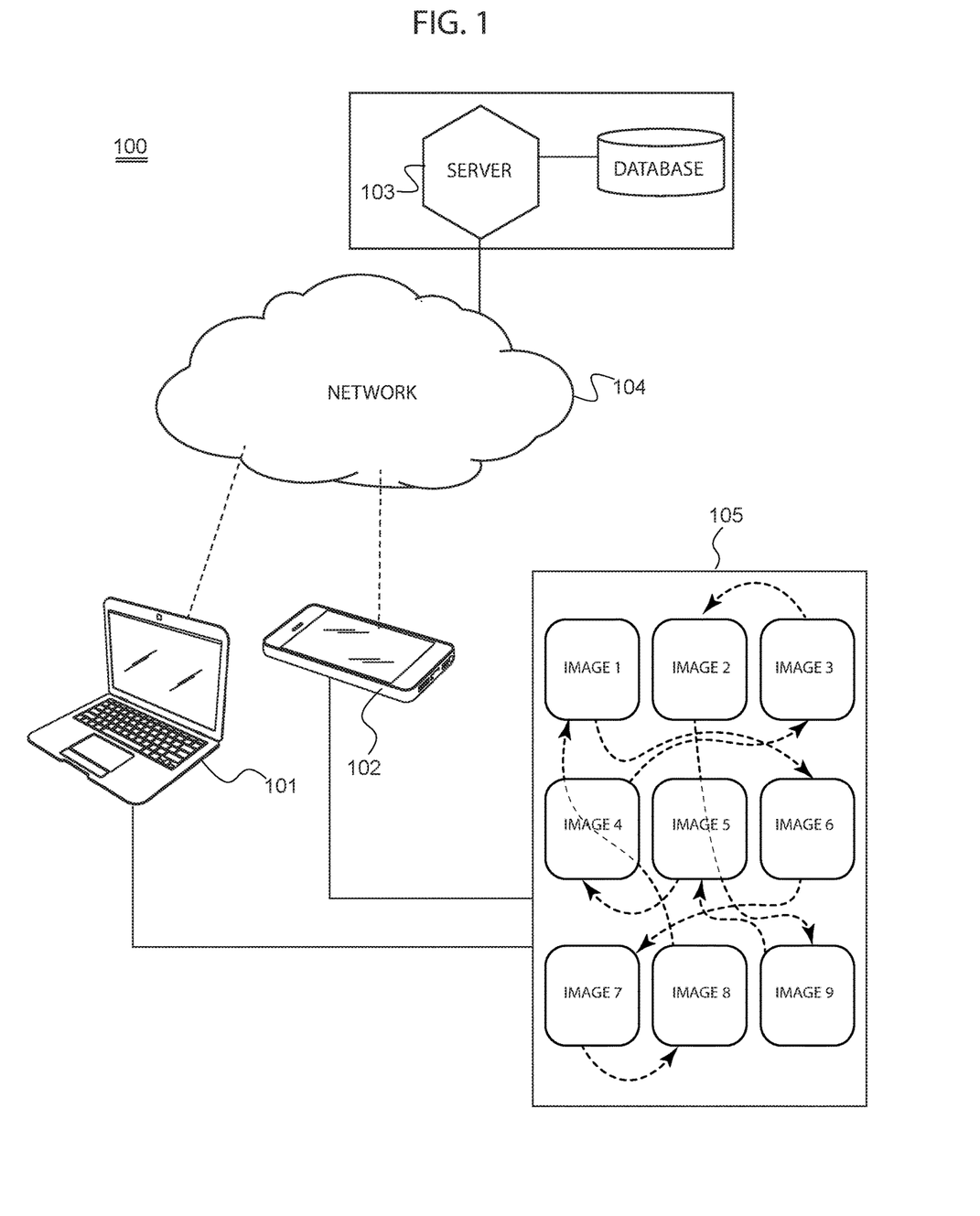
FIG. 1 illustrates a system in accordance with an exemplary embodiment of the present invention, depicting several exemplary components that may be employed.

Turning now to the figures, FIG. 1 illustrates a system in accordance with an exemplary embodiment of the present invention, depicting several exemplary components that may be employed. More specifically, FIG. 1 depicts system 100, which includes a first client device 101, a second client device 102, which may typically communicate with a server 103 via a network 104 such as the internet. The server 103 may host a mobile application including a graphical user interface or GUI 105 that may be downloaded by the client devices 101 and 102.

As will be explained further below, in exemplary embodiments, the GUI may be configured to display a folder for storing the data and or mobile applications desirably secured with the security application. When the user selectively decides to launch a mobile application or access data "stored" within said folder, a first screen of the GUI may be launched displaying a set of images as a means of implementing an authentication protocol to provide a user with access to the desired mobile application. In exemplary embodiments, the user may control certain settings such as the source of the authenticating images, the number of images and authenticating images, and or a sequence that may be an authenticating sequence associated with the authenticating images for granting access to the one or more mobile applications or data "stored" within the displayed folder.

For example, and without limiting the scope of the present invention, GUI 105 is stored within one or each of the client devices 101 and 102. In exemplary embodiments, GUI 105 is configured to: receive a request to launch a secured application; launch a first window within a mobile device touchscreen, the first window including a plurality of images comprising at least one authenticating image; within the first window, periodically shuffle a position of one or more of the plurality of images; receive via the mobile device touchscreen a user input comprising an ordered selection of the at least one authenticating image; match the ordered selection to a programmable ordered selection including the at least one authenticating image; and launch a second window in response to the user input via the mobile device touchscreen, wherein the second window includes a launch screen of a secured application. In exemplary embodiments, only after this sequence will a user be able to access the data or mobile application secured with the software comprising GUI 105.

Figure 2:
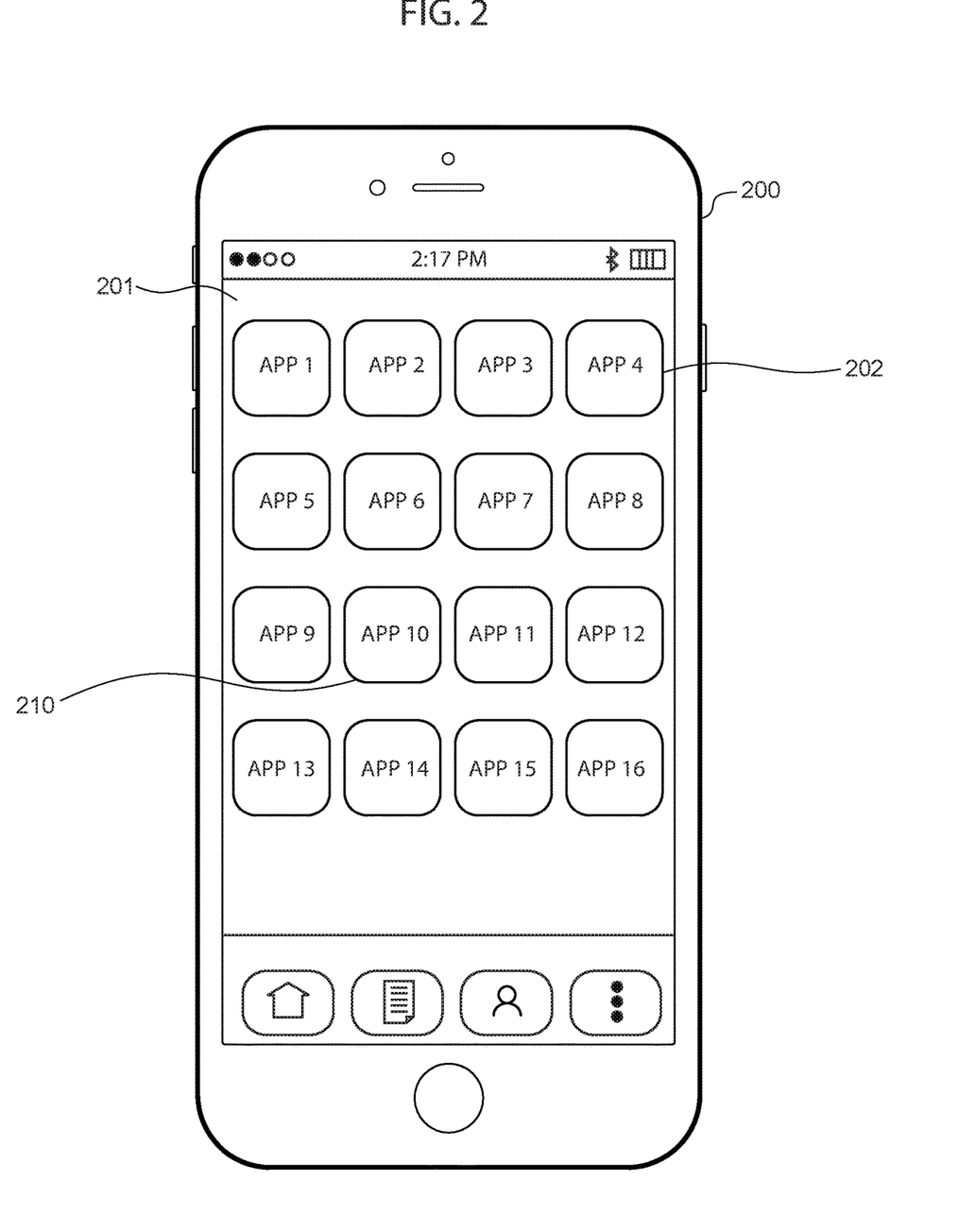
FIG. 2 illustrates a screen output from a prior art graphical user interface that may be employed in a mobile device such as a smartphone.

FIG. 2 illustrates a screen output from a prior art graphical user interface that may be employed in a mobile device such as a smartphone. More specifically, this figure shows a mobile device 200, which may include a typical display screen 201 displaying a plurality of typical mobile device applications 202 (for example APP1-APP9, and APP11-APP16 are typical or prior art mobile applications stored in device 200). By way of example, and without limiting the scope of the present invention, APP10 may be a security application 210 in accordance with the present invention. From this view, it may be appreciated that typically security application 210 may reside and be displayed as any other application on the device. The next figure however, depicts how in exemplary embodiments, a folder feature may be employed to allow a user to select which mobile applications may be desirably secured via security protocols employed by security application 210.

Figure 3:
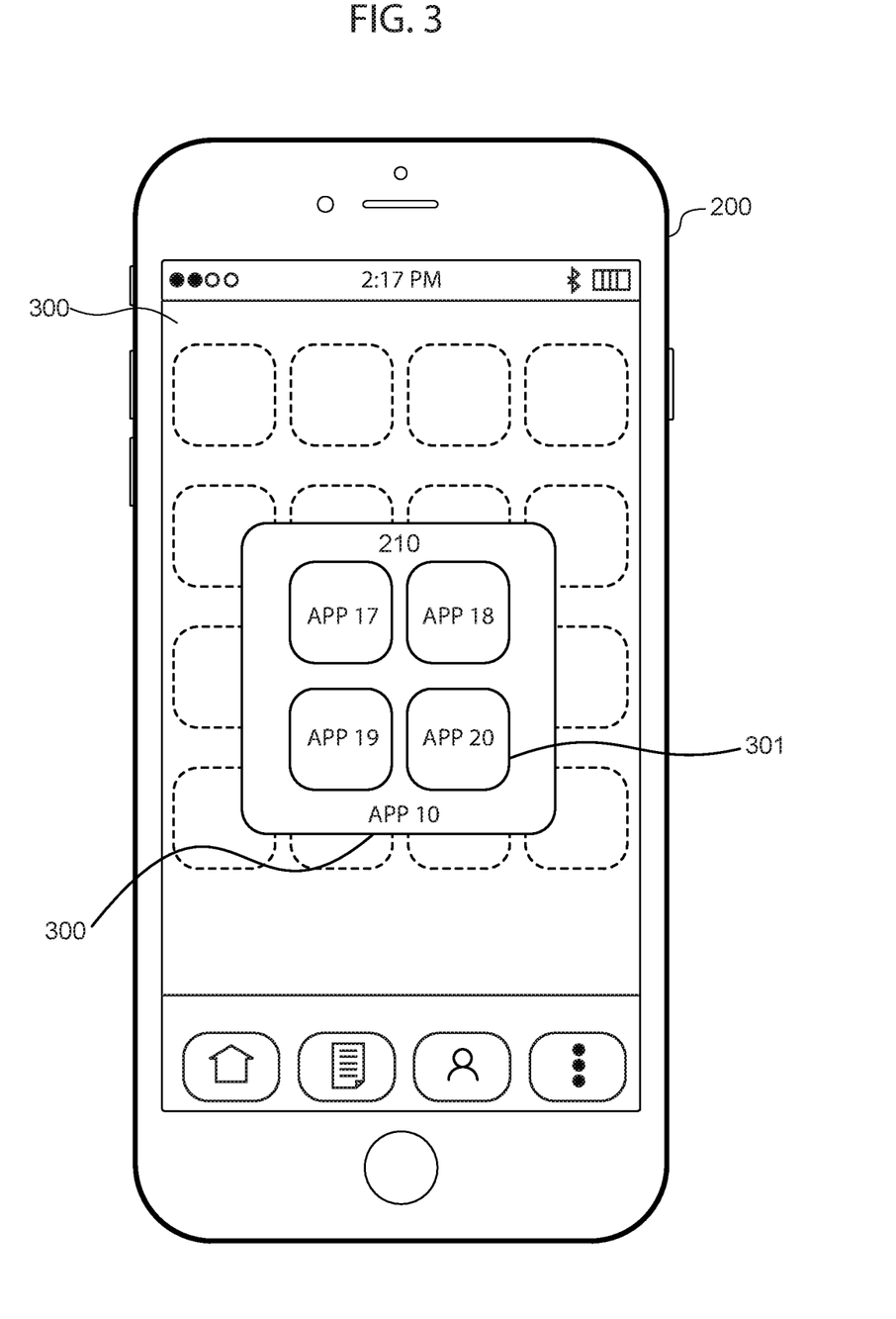
FIG. 3 illustrates a screen output from a security application comprising a graphical user interface in accordance with an exemplary embodiment of the present invention, wherein access to other mobile applications may be secured via said security application.

Turning now to the next figure, FIG. 3 illustrates a screen output from a security application comprising a graphical user interface in accordance with an exemplary embodiment of the present invention, wherein access to other mobile applications may be secured via said security application. More specifically, this figure depicts a screen output that may be generated by a GUI in accordance with the present invention, whenever a user selects a security application such as security application 210 in accordance with the present invention. Upon selecting security application 210, a folder 300 may be displayed showing a plurality of mobile applications that may be secured by security application 210. As with known folder features employed in prior art devices, folder 300 may display a virtual storage space such that a user may select one of their mobile applications and virtually move the mobile application via touch input of a touchscreen display of the mobile device into the virtual storage space of folder 300. Once "stored" within folder 300, access to the mobile application will be provided only after successful authentication via a security protocol as will be explained further below.

For example, and without deviating from the scope of the present invention, in this exemplary embodiment of FIG. 3, mobile applications APP17-APP20 have been secured using security application 210. Whenever a user of device 200 desires to access data or otherwise utilize one of these applications "stored" within folder 300, the security protocol will be launched—and more specifically a GUI of the security app will launch a screen including a plurality of images from which a user must select one or more or a series of authenticating images in order to gain access to the selected mobile application. Accordingly, in some exemplary embodiments, if a user were to select application 301, a screen as shown in the next figure may be launched to initiate a security protocol in accordance with the present invention prior to allowing access to or launching application 301. Alternatively, in some exemplary embodiments, a screen as shown in the next figure may be launched to initiate a security protocol in accordance with the present invention prior to even opening folder 300; that is, in some exemplary embodiments, launching application 210 (or APP10) will initiate a security protocol prior to displaying the contents of folder 300, such as mobile applications APP17-APP20. The security protocol in accordance with the present invention is discussed in turn.

Figure 4A:
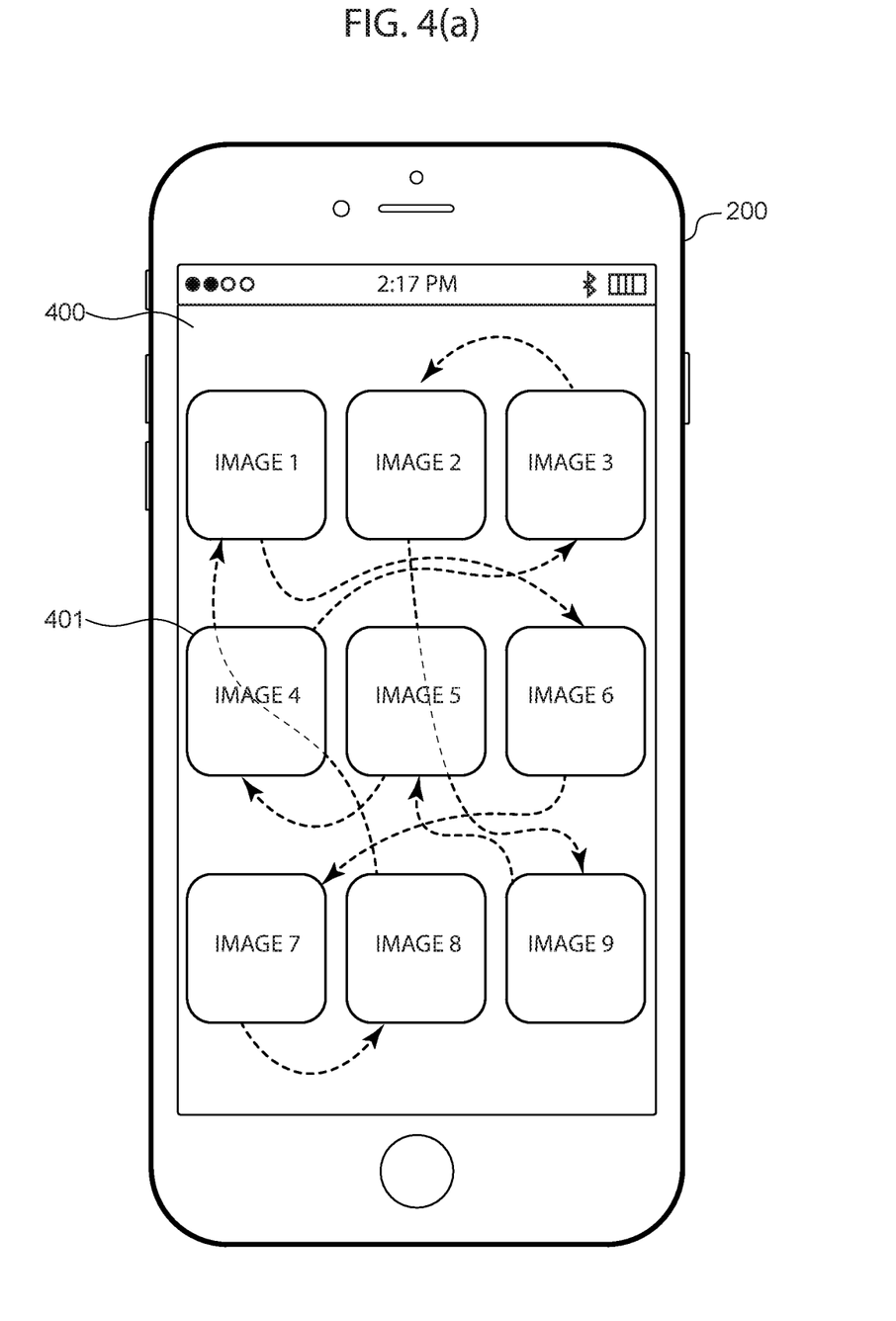
FIG. 4(a) illustrates a screen output from an exemplary graphical user interface in accordance with an exemplary embodiment of a security application, wherein a plurality of images are displayed and shuffled within the screen, and at least one of the images or a sequence of images must be selected to gain access to mobile applications secured therein

Turning now to FIG. 4(*a*), a screen output from an exemplary graphical user interface in accordance with an exemplary embodiment of a security application is depicted, wherein a plurality of images are displayed and shuffled within the screen, and at least one of the images or a sequence of images must be selected to gain access to mobile applications secured therein. More specifically, and only by way of example and without limiting the scope of the present invention, screen output 400 may be launched upon receiving a request to launch an application, say application 301 or APP20. In this first window, a plurality of images may be displayed comprising at least one authenticating image. Typically, the set of images implements an authentication protocol to provide a user with access to the desired mobile application APP20, whereby a user must select from the images, a set of one or more authenticating images. The images are typically, although not necessarily, in motion or in transition state so that an image does not maintain a single position on the screen for too long.

Figure 4B:
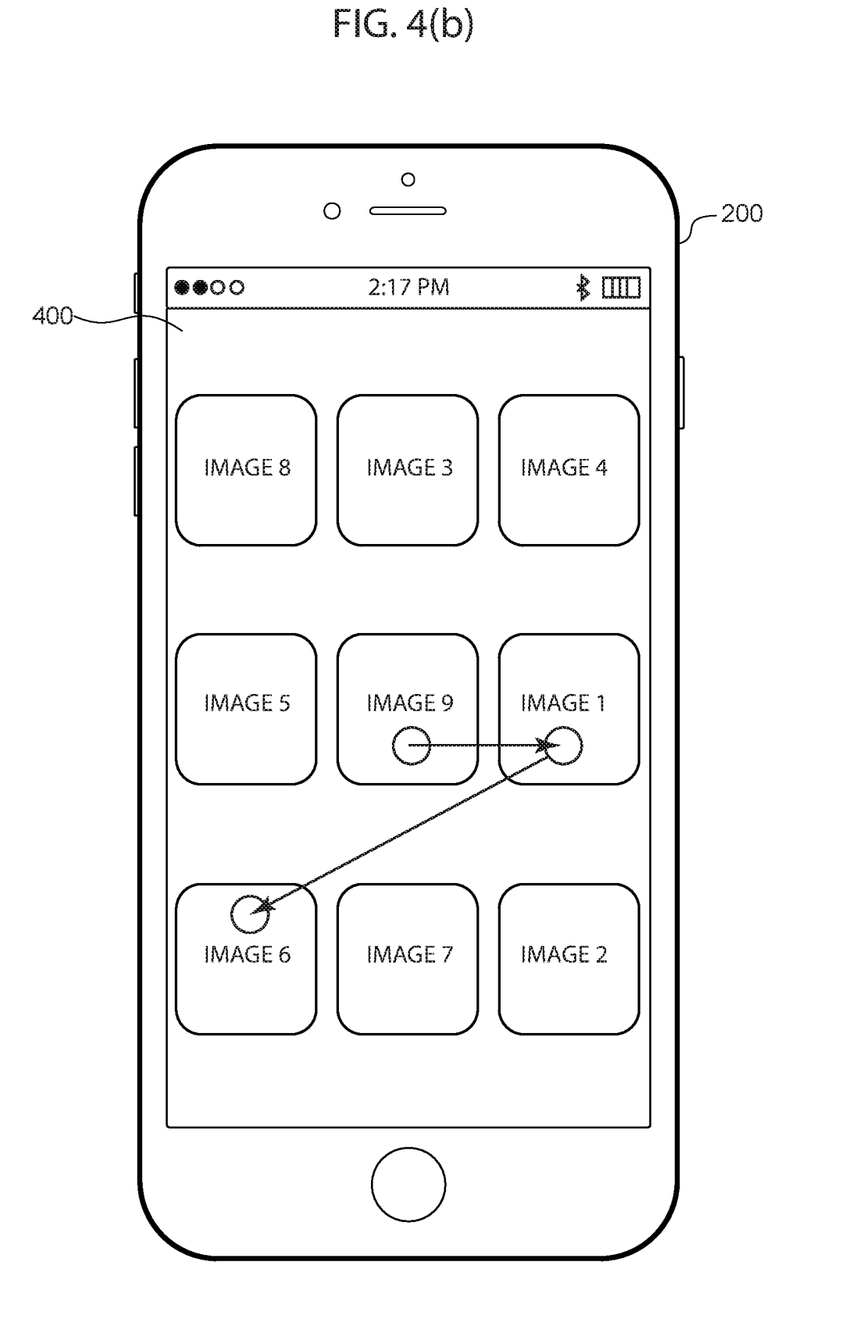
FIG. 4(b) illustrates a screen output from an exemplary graphical user interface in accordance with an exemplary embodiment of the present invention, wherein a plurality of images are displayed and shuffled within the screen.

In exemplary embodiments, each of the images may periodically shuffle. In other embodiments, the shuffling may be continuous. In other embodiments, there is no shuffling and only static images are displayed. In some exemplary embodiments, the images move for a period of time and may—for example and in no way limiting the invention—remain still in a different order for a period of time—as shown in FIG. 4(*b*). FIG. 4(*b*) illustrates the screen output 400 after a shuffling or transition has occurred, wherein the plurality of images have been shuffled and are as such in an alternative position distinct from their initial position as exemplarily shown in FIG. 4(*a*). In exemplary embodiments, the GUI is configured to: (a) receive via the mobile device touchscreen a user input comprising an ordered selection of the at least one authenticating image—for example, and without limiting the scope of the present invention, the at least one authenticating image may include a plurality of authenticating images Image1, Image6, and Image9 selected from the plurality of images 401 (i.e. Image1-Image9). Moreover, an order selection may include any order or sequence of the plurality of authenticating images Image1, Image6, and Image9; this may include any sequence such as Image1, Image6, and Image9; or Image1, Image9, and Image6; or Image6, Image9, and Image1; or Image6, Image9, and Image1; and any other combination or sequence thereof (which matches a programmable ordered selection); (b) match the ordered selection to the programmable ordered selection including the at least one authenticating image; and (c) launch a second window in response to the user input via the mobile device touchscreen, wherein the second window includes a launch screen of a secured application. For example, and without limiting the scope of the present invention, launching the second window may include launching a first window of APP20 after successfully selecting the programmable ordered selection including the at least one authenticating image.

Accordingly, in exemplary embodiments of the present invention, a system for securing and accessing a mobile application, may include: a client device 200; one or more mobile applications 202 stored within the client device 200; and a graphical user interface (GUI) 300 stored within the client device 200 and configured to: receive a request to launch a secured application 301; launch a first window 400 within a mobile device 200 touchscreen, the first window 400 including a plurality of images 401 comprising at least one authenticating image, such as authenticating images Image1, Image6, and Image9; within the first window 400, periodically shuffles a position of one or more of the plurality of images 401; receive via the mobile device touchscreen a user input comprising an ordered selection of the at least one authenticating image; match the ordered selection to a programmable ordered selection including the at least one authenticating image; and launch a second window in response to the user input via the mobile device touchscreen, wherein the second window includes a launch screen of a secured application. As mentioned above, the second window may include launching a first window of APP20 after successfully selecting the programmable ordered selection including the at least one authenticating image.

Similarly, a method for accessing a secured mobile application by way of a graphical user interface (GUI), in accordance with exemplary embodiments of the present invention, includes: receiving a request to launch a secured application 300; launching a first window 400 within a mobile device 200 touchscreen, the first window 400 including a plurality of images 401 comprising a plurality of authenticating images (e.g. Image1, Image6, and Image9); within the first window 400, periodically shuffling a position of one or more of the plurality of images 401 (see FIG. 4(*a*)); receiving via the mobile device 200 touchscreen a user input comprising an ordered selection (see FIG. 4(*b*)) of the plurality of authenticating images; matching the ordered selection to a programmable ordered selection of the plurality of authenticating images (e.g. sequence Image9, Image1, and Image6); and launching a second window in response to the user input via the mobile device touchscreen, wherein the second window includes a launch screen of a secured application (not shown).

In FIG. 4(*a*), the arrows with dotted lines depict movement or a shuffling of a position of one each of the images indicated therein. For example, and without limiting the scope of the present invention, Image1 may be positioned where Image6 is shown, Image2 may be positioned where Image9 is shown, Image3 may be positioned where Image2 is shown, Image4 may be positioned where Image3 is shown, Image5 may be positioned where Image4 is shown, Image6 may be positioned where Image7 is shown, Image7 may be positioned where Image8 is shown, Image8 may be positioned where Image1 is shown, and Image9 may be positioned where Image5 is shown. Accordingly, in some embodiments, after one cycle of shuffling, each of the positions of the images Image1-Image9 may start as in FIG. 4(*a*) and end up positioned as shown in FIG. 4(*b*).

The shuffling may comprise any transition graphic without limiting the scope of the present invention. That is, in some exemplary embodiments, an image may simply disappear and appear at a subsequent position; in some exemplary embodiments, an image may move from an initial position to a subsequent position.

In exemplary embodiments, shuffling occurs only once. In exemplary embodiments, shuffling reoccurs at programmed intervals. In exemplary embodiments, each of the images moves to a different position, while in other exemplary embodiments, only some of the images moves or gets shuffled to a different position. In exemplary embodiments, each of these options may be configured or selected by a user.

Accordingly, in some exemplary embodiments, a method for accessing a secured mobile application by way of a graphical user interface (GUI), comprising: receiving a request to launch a secured application; launching a first window within a mobile device touchscreen, the first window including a plurality of images comprising a plurality of authenticating images; within the first window, periodically shuffling a position of one or more of the plurality of images; receiving via the mobile device touchscreen a user input comprising an ordered selection of the plurality of authenticating images; authenticating access to a secured application by matching the ordered selection to a programmable ordered selection of the plurality of authenticating images; and launching a second window in response to the user input via the mobile device touchscreen, wherein the second window includes a launch screen of the secured application.

Similarly, in some exemplary embodiments, a system for securing and accessing a mobile application, comprising: a client device; one or more mobile applications stored within the client device; and a graphical user interface (GUI) stored within the client device and configured to: receive a request to launch a secured application; launch a first window within a mobile device touchscreen, the first window including a plurality of images comprising a plurality of authenticating images; within the first window, periodically shuffle a position of one or more of the plurality of images; receive via the mobile device touchscreen a user input comprising an ordered selection of the plurality of authenticating images; authenticate access to a secured application by matching the ordered selection to a programmable ordered selection of the plurality of authenticating images; and launch a second window in response to the user input via the mobile device touchscreen, wherein the second window includes a launch screen of the secured application.

Figure 5:
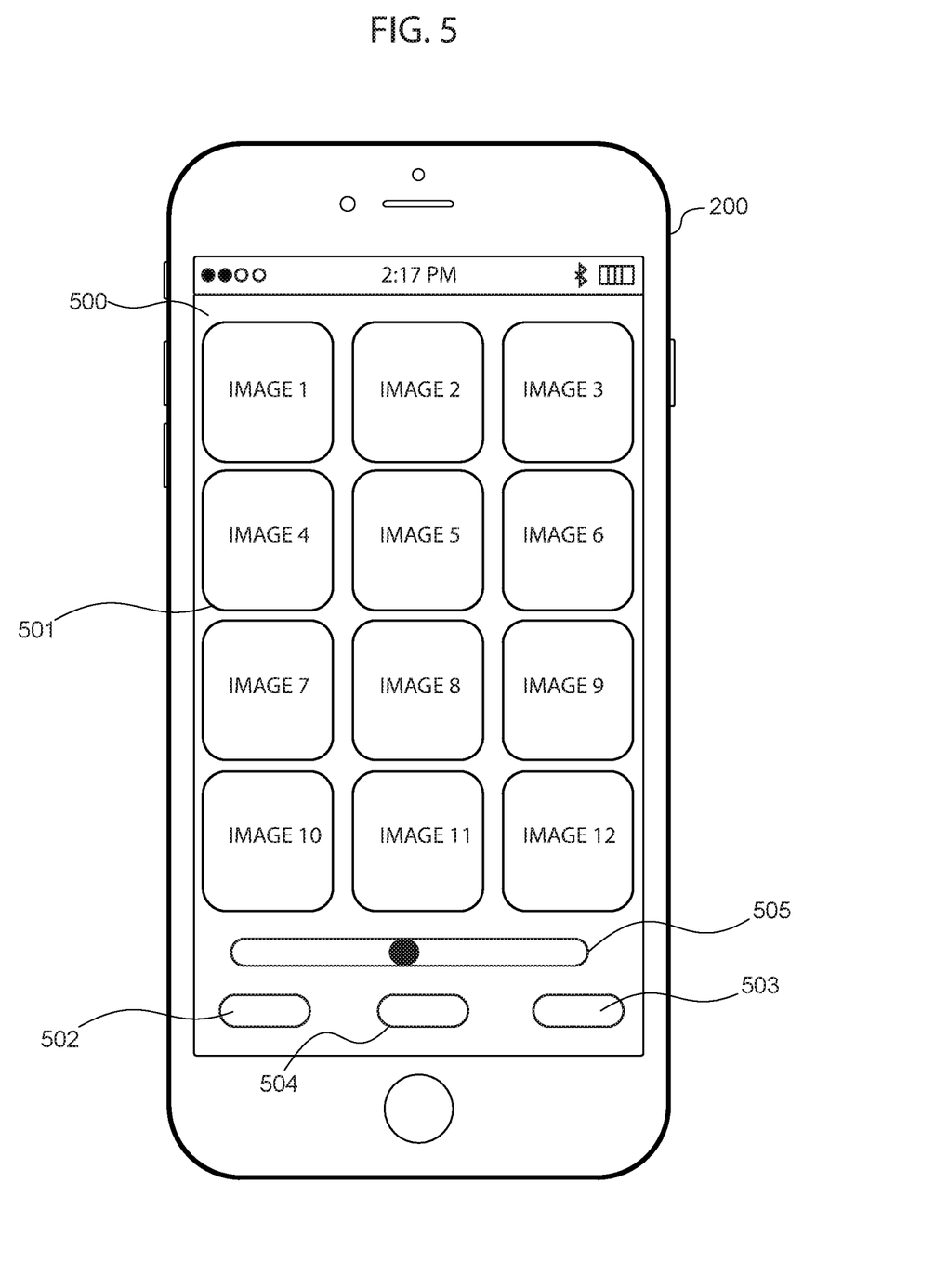
FIG. 5 illustrates a screen output from an exemplary graphical user interface in accordance with an exemplary embodiment of the present invention, providing a user with selectable images to be associated with an authentication code and other user options.

Turning now to the next figure, FIG. 5 illustrates a screen output from an exemplary graphical user interface in accordance with an exemplary embodiment of the present invention, providing a user with selectable images to be associated with an authentication code and other user options. More specifically, this view shows screen output 500, which includes a selection of images 501 for the user to select from. The images may be added to the application manually or may be supplied via access to a camera or photo album stored within the device 200.

A plurality of functions may be provided via virtual buttons such as a selection button 502 that may allow a user to select the number of images to be supplied at the authentication screen as well as the number of authenticating images that will be included with the total number of images presented at the authentication screen. For example, and in no way limiting the scope of the present invention, a user may select any number of images, say 12 images, to display at the authentication screen but only select some of the images, say 2 images, which the user must select to achieve authentication. Alternatively, a user may select 12 images and select 3 authenticating images that the user must select to achieve authentication. Moreover, in some embodiments, a user may select a sequence in which the authenticating images must be selected in order to achieve authentication.

For example, and only by way of illustration and without limiting the scope of the present invention, with reference to FIG. 4(*a*), a user may select 9 images (Image1-Image9), and from these images select 1, 6, and 9, as authenticating images. Furthermore, in some embodiments, a sequence may be selected such as 9-1-6. Accordingly, after the shuffling sequence from FIG. 4(*a*) to FIG. 4(*b*), a user would first select Image9, then select Image1, and then Image6 in order to unlock or gain access to the data secured through the application (i.e. this user selection and sequence shown with straight arrows between each image).

To manipulate the number of images 501, number of authenticating images, sequence, and or any combination thereof, screen output 500 may be provided. Functions that may be provided to users may include, without limitation, selecting the number of total images to be displayed (e.g. selecting nine images may yield an output such as window 400 in which nine images are displayed); selecting one or more authenticating images; selecting a sequence for selecting a sequence in which the authenticating images must be selected in order to achieve authentication, wherein the selection of the sequence may generate a programmable ordered selection, the selection being able to be edited by the user; and a transition or shuffle parameter control that facilitates user selected options for the length of time between shuffling image positions, the type of transitions (i.e. visual effects between movements of images between positions), and any other effects that may achieve a visual shuffle of the images.

In some exemplary embodiments, such as depicted in FIG. 5, a window or screen output 500 may include a plurality of images 501 retrieved from a local or remote library, and displayed within window 500 to provide the user with options for selecting the authenticating images.

In some exemplary embodiments, a button 502 may be provided to select the number of images to be displayed—any means may be provided, such as but not limited to a drop down menu, a list with options for the number of images, or any other means of selecting the number of images to be displayed. In some exemplary embodiments, button 502 facilitates accessing the local or remote library and selecting alternative, additional, or specific images to be displayed on this screen or window 500 commensurate with the number of images the user wants displayed—generally the more images shown the more difficult the authentication is for intruders since there are a greater number of possible combinations to select from.

In some exemplary embodiments, button 503 for selecting the authenticating images may be provided. For example, activating or touching button 503 may prompt for the selection of the images displayed in window 500; as a person of ordinary skill in the art will appreciate, any other means may be implemented, such as generating a list, drop down menu, or any other means of prompting a user and facilitating selection of the images the user desires to select as authenticating images. In exemplary embodiments, pressing button 503 will place the images in a selectable format so that a user can select from the plurality of images 501, those that will be used as authenticating images.

In some exemplary embodiments, button 504 may be provided for selecting a transition, or providing a shuffle parameter control, that facilitates user selected options for the length of time between shuffling image positions, the type of transitions (i.e. visual effects between movements of images between positions), and any other effects that may achieve a visual shuffle of the images.

Alternatively, or additionally (as shown) a supply of images may be regularly implemented by the application from an image library and the number of these images may be controlled via slidable button such as slider 505. As may be appreciated, different variations of selecting a number of images and authenticating images may be employed without deviating from the scope of the present invention and any number of images and any number of authenticating images may be selected without deviating from the scope of the present invention.

Figure 6:
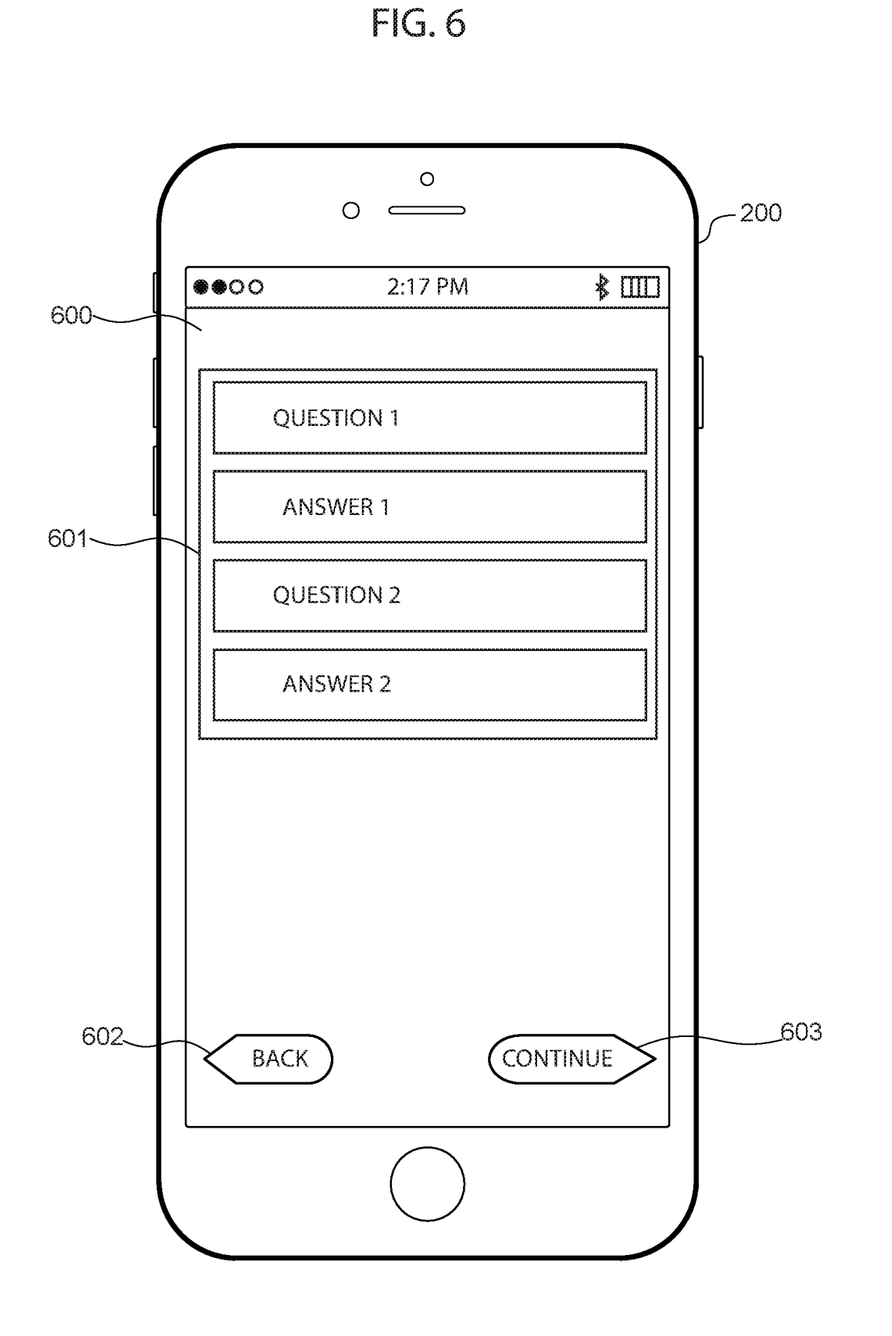
FIG. 6 illustrates a screen output from an exemplary graphical user interface in accordance with an exemplary embodiment of the present invention, guiding a user to set up an authentication means of securing applications within the security application.

FIG. 6 illustrates a screen output from an exemplary graphical user interface in accordance with an exemplary embodiment of the present invention, guiding a user to set up an authentication means of securing applications within the security application. That is, once the images, including the number and or sequence of authenticating images is selected, a user may be provided with another window or screen out put 600 in order to set up one or more security questions. In such screen, a typical set of questions and answers 601 may be provided for the user to set up. To help a user navigate away from this screen and or to continue the set-up process, navigational buttons 602 and 603 may be provided.

Figure 7:
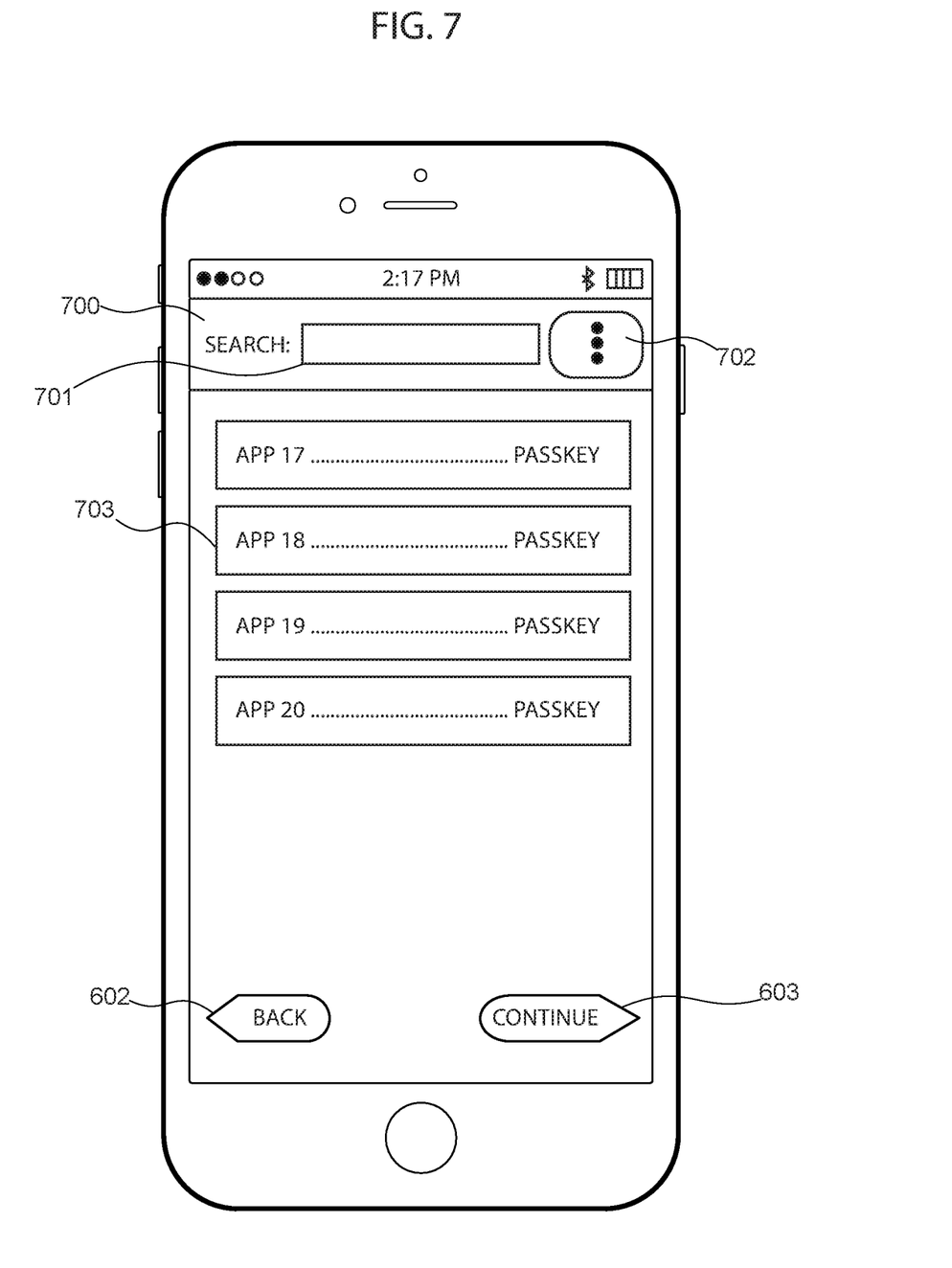
FIG. 7 illustrates a screen output from an exemplary graphical user interface in accordance with an exemplary embodiment of the present invention, providing a user with a searchable list of passcodes or passkeys associated with mobile device applications secured via the security application.

Turning now to the next figure, FIG. 7 illustrates a screen output 700 from an exemplary graphical user interface in accordance with an exemplary embodiment of the present invention, providing a user with a search function 701 of a searchable list 703 of passcodes or passkeys associated with mobile device applications secured via the security application. In this view, it may be appreciated that a user can view passkeys stored for each and every mobile application secured with security app 210, the passkey typically comprising a plurality of selected authenticating images and the sequence of selection. As a person of ordinary skill in the art will appreciate, a plurality of functions and accessibility options may be provided by any means, including for example a menu button 702 that provides access to said functions.

Figure 8A:
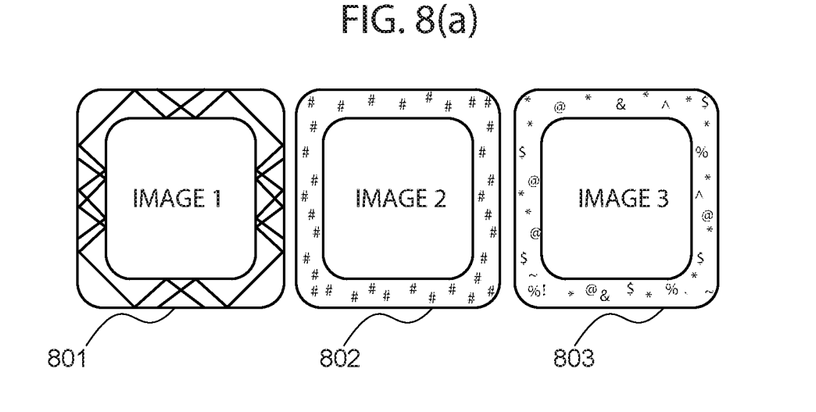
FIG. 8(a)-FIG. 8(c) illustrate exemplary visual variations that may be implemented for strengthening a visual authentication, in accordance with exemplary embodiments of the present invention.

FIG. 8(*a*) illustrates exemplary visual variations that may be implemented for strengthening a visual authentication, in accordance with exemplary embodiments of the present invention. More specifically, this figure shows how frames 801-803 for images 1-3, respectively, may further include design elements as visual outputs that may be used to further authenticate an image. That is, each of the frames may have shapes, patterns, characters, or a combination thereof that may be unique and may help the user identify an image, or further make the authenticating image more unique by adding the design element. In exemplary embodiments, each of the frames of each image also shuffles such that an image may be shown in a first position with a first frame, and then in a second position with a second frame. Similarly, a myriad of variations may be provided to a user for visual authentication.

Figure 8B:
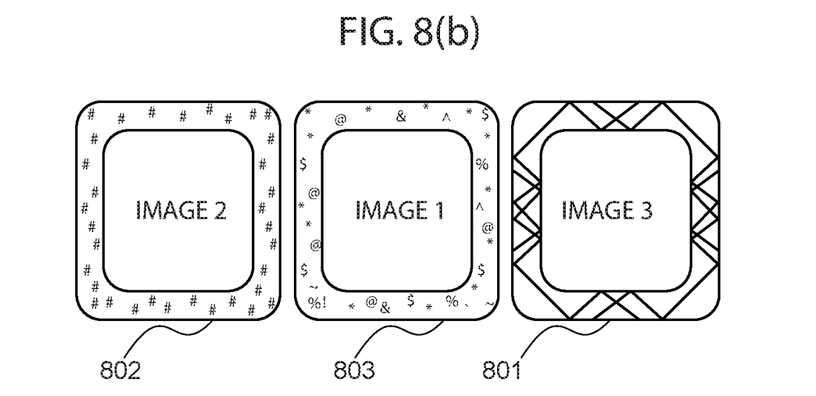
Figure 8C:
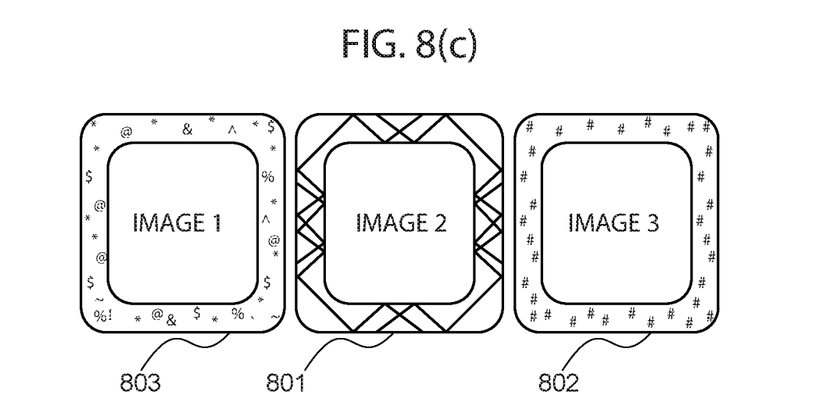

FIG. 8(*a*)-FIG. 8(*c*) depicts an exemplary sequence that may be presented to a user by way of example and in no way limiting the scope of the present invention. In FIG. 8(*a*), image 1 is in a first position (for example a left position) and includes frame 801 that borders image 1. Image 2 is in a second position (for example a middle position) and includes frame 802 that borders image 2. Image 3 is in a third position (for example a right position) and includes a frame 803 that borders image 3. In FIG. 8(*b*), a shuffling sequence has been initiated and each of the images and frames and positions have been shuffled, so that now image 2 is in a first position (for example a left position) and includes frame 802 that now borders image 2. Image 1 is in a second position (for example a middle position) and now includes frame 803 that borders image 1. Image 3 may exemplarily remain in a third position (for example a right position) but now includes a frame 801 that borders image 3. In FIG. 8(*c*), a shuffling sequence has continued, and may continue until a selection is made, and each of the images and frames and positions have been further shuffled, so that image 1 is now back to a first position (for example a left position) and includes frame 803 that now borders image 1. Image 2 is back in a second position (for example a middle position) but now includes frame 801 that borders image 2. Image 3 may exemplarily remain in a third position (for example a right position) but now includes a frame 802 that borders image 3. Of course, this shuffling can go on and may be more or less complex depending inpart on the number of images and frames available, but a person of ordinary skill in the art will be able to implement a desired number of combinations suitable for a desired complexity of a passkey, such as a set of number and sequence of authenticating combinations.

Figure 9:
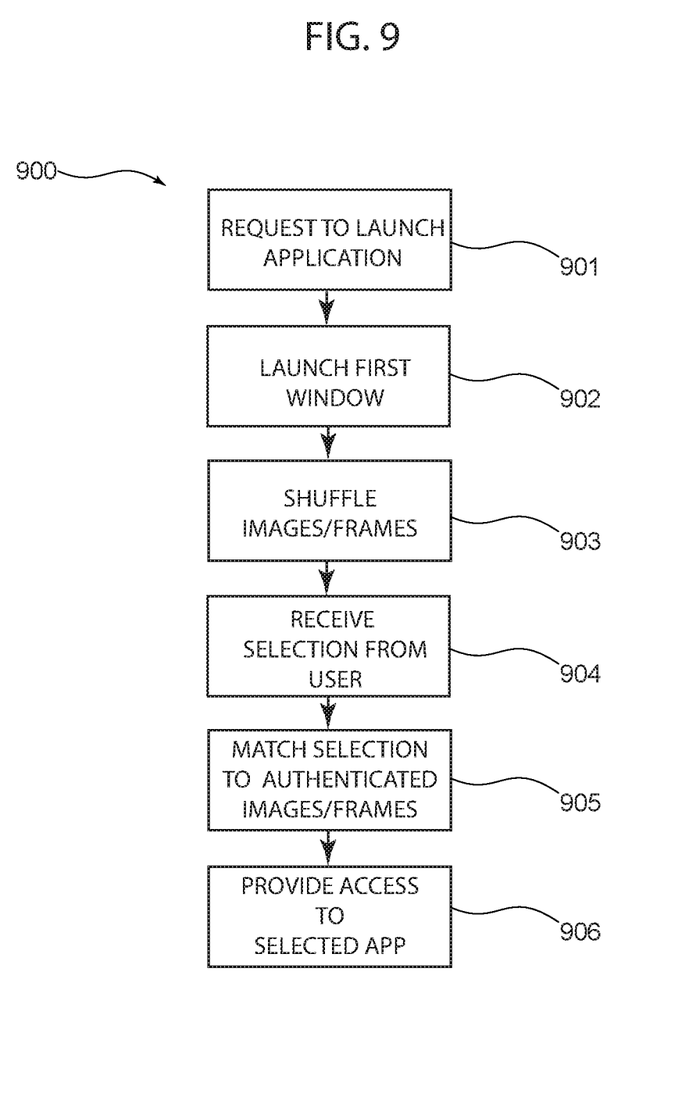
FIG. 9 illustrates a method in accordance with exemplary embodiments of the present invention.

Turning now to the next figure, FIG. 9 illustrates a method in accordance with exemplary embodiments of the present invention. More specifically, this figure shows method 900 for accessing a secured mobile application by way of a graphical user interface (GUI), which comprises: (901) receiving a request to launch a secured application; (902) launching a first window within a mobile device touchscreen, the first window including a plurality of images comprising at least one authenticating image; (903) within the first window, periodically shuffling a position of one or more of the plurality of images; (904) receiving via the mobile device touchscreen a user input comprising an ordered selection of the at least one authenticating image; (905) matching the ordered selection to a programmable ordered selection including the at least one authenticating image; and (906) provide access by launching a second window in response to the user input via the mobile device touchscreen, wherein the second window includes a launch screen of a secured application.

Figure 10:
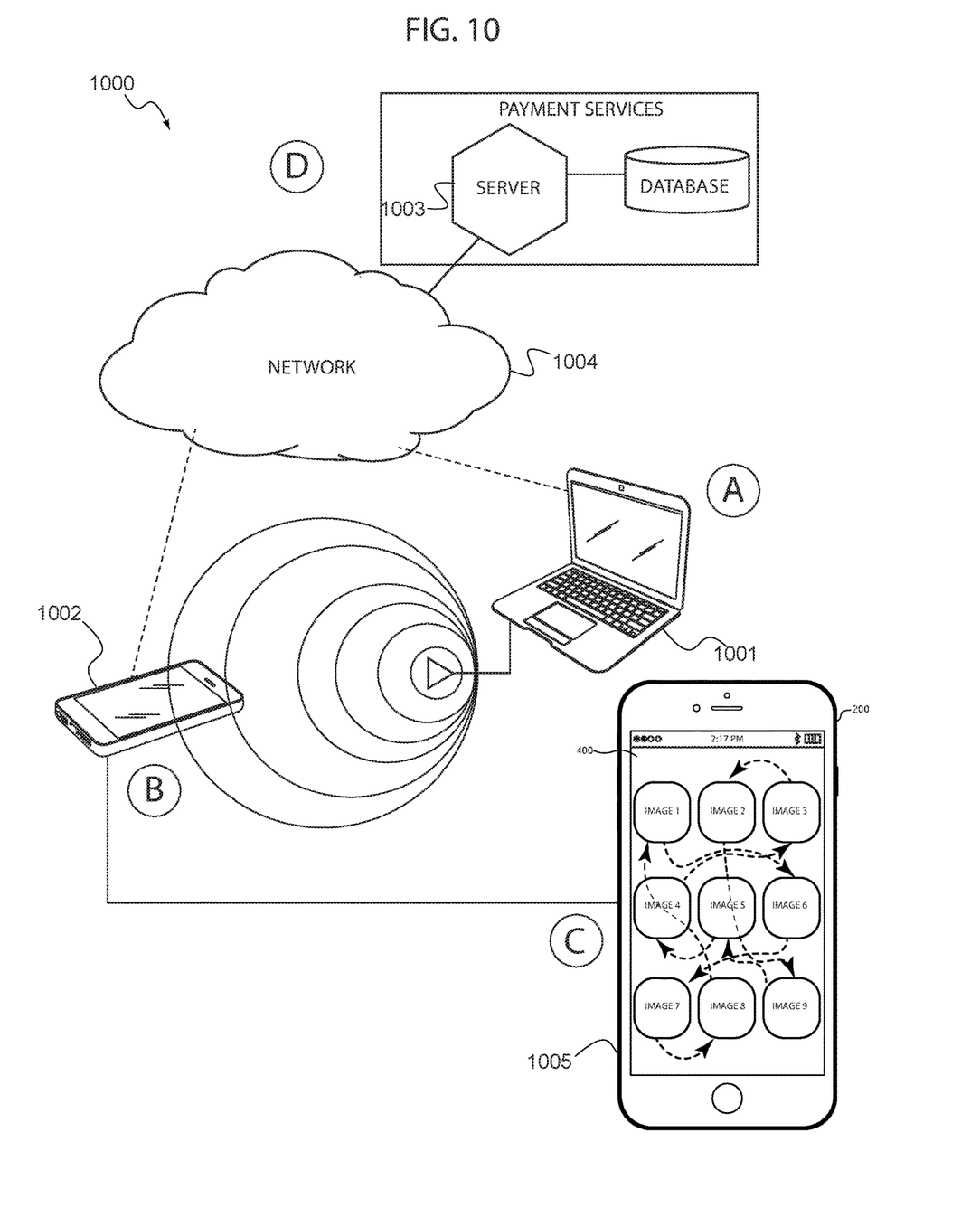
FIG. 10 illustrates another system and an exemplary method in accordance with exemplary embodiments of the present invention, wherein a security application is utilized for payment via second client device.

FIG. 10 illustrates another system and an exemplary method in accordance with exemplary embodiments of the present invention, wherein a security application is utilized for payment via second client device. More specifically, this figure shows system 1000 for authenticating a payment via a secured mobile application, including: a first client device 1001 configured to communicate with a server 1003 hosting a payment portal; a second client device 1002 configured to communicate with the first client device 1001 via wireless interface such as Bluetooth, NFC, RFID, Wi-Fi or any other wireless means; at least one secure payment application stored within the second client device 1002; a graphical user interface (GUI) 1005 executable by the second client device 1002, configured to: (i) receive a request to launch the secure payment application; (ii) launch a first window within a touchscreen of the second client device, the first window including a plurality of images comprising at least one authenticating image; (iii) within the first window, periodically shuffle a position of one or more of the plurality of images; (iv) receive a user input comprising an ordered selection of the at least one authenticating image; (v) match the ordered selection to a programmable ordered selection including the at least one authenticating image; (vi) launch a second window in response to the user input via the mobile device touchscreen, wherein the second window includes a launch screen of the secured payment application; and (vii) send a secured payment information to the server from the second client device.

Similarly, a method for authenticating a payment via a secured mobile application, in accordance with exemplary embodiments of the present invention, includes: (A) establishing a first communication between a first client device 1001 and a server 1003 hosting a payment portal; (B) establishing a second communication between a second client device 1002 and the first client 1001 device via a wireless interface 1004, wherein the second client device 1002 includes at least one secure payment application and a graphical user interface (GUI) 1005 executable by the second client device 1002; (C-1) receiving a request (via the GUI) to launch the secure payment application; (C-2) launching a first window within a touchscreen of the second client device, the first window including a plurality of images comprising at least one authenticating image; (C-3) within the first window, periodically shuffle a position of one or more of the plurality of images; (C-4) receiving a user input comprising an ordered selection of the at least one authenticating image; (C-5) matching the ordered selection to a programmable ordered selection including the at least one authenticating image; (C-6) launching a second window in response to the user input via the mobile device touchscreen, wherein the second window includes a launch screen of the secured payment application; and (D) sending a secured payment information to the server from the second client device.

As may be appreciated by one skilled in the art, many variations on a system and method for accessing a secured mobile application in accordance with the present disclosure may be achieved without deviating from the scope of the invention. A system and method for accessing a secured mobile application has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A system for securing and accessing a mobile application, comprising:
   a client device;
   one or more mobile applications stored within the client device; and
   a graphical user interface (GUI) stored within the client device and configured to:
      receive a request to launch a secured application;
      launch a first window within a mobile device touchscreen, the first window including a plurality of images comprising a plurality of authenticating images;
      within the first window, periodically shuffle a position of one or more of the plurality of images moving for a period of time until a user input is received, wherein each of the plurality of images is displayed with a frame having a variable design that periodically changes along with the periodically shuffling of the position of one or more of the plurality of images;
      receive via the mobile device touchscreen the user input comprising an ordered selection of the plurality of authenticating images;
      authenticate access to a secured application by matching the ordered selection to a programmable ordered selection of the plurality of authenticating images; and
      launch a second window in response to the user input via the mobile device touchscreen, wherein the second window includes a launch screen of the secured application.

2. The system of claim 1, wherein periodically shuffling the position of the one or more of the plurality of images comprises:
   moving at least one image from an initial position to a subsequent position; and
   shuffling the variable design of the frame of each of the plurality of images with the periodically shuffling of the position of the one or more of the plurality of images.

3. The system of claim 1, wherein periodically shuffling the position of the one or more of the plurality of images comprises a transition graphic.

4. The system of claim 1, wherein the step of periodically shuffling reoccurs at programmed intervals.

5. The system of claim 1, further comprising: launching a third window that displays a user interface configured to enable user selection of the plurality of authenticating images.

6. The system of claim 1, further comprising: launching a third window that displays a user interface configured to enable user selection of a sequence in which the plurality of authenticating images must be selected in order to achieve authentication.

7. The system of claim 1, further comprising: launching a third window that displays a shuffle parameter control that facilitates user selected options for a length of time between shuffling image positions.

8. The system of claim 1, wherein the secured application comprises a folder displaying a virtual space for storing one or more application files.

* * * * *